United States Patent
Khanna et al.

(10) Patent No.: US 10,462,224 B2
(45) Date of Patent: Oct. 29, 2019

(54) COORDINATOR FOR LOW POWER SENSOR NETWORK WITH TREE OR STAR TOPOLOGY

(71) Applicant: Intel Corporation, Santa Clara, CA (US)

(72) Inventors: Rahul Khanna, Portland, OR (US); Greeshma Pisharody, Portland, OR (US); Christopher R. Carlson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 15/636,699

(22) Filed: Jun. 29, 2017

(65) Prior Publication Data
US 2019/0007496 A1    Jan. 3, 2019

(51) Int. Cl.
| H04L 29/08 | (2006.01) |
| H04L 12/24 | (2006.01) |
| H04W 52/02 | (2009.01) |
| H04L 12/727 | (2013.01) |
| H04L 12/753 | (2013.01) |
| H04L 12/751 | (2013.01) |
| H04W 40/02 | (2009.01) |
| H04W 84/18 | (2009.01) |

(52) U.S. Cl.
CPC .......... *H04L 67/12* (2013.01); *H04L 41/0806* (2013.01); *H04L 41/12* (2013.01); *H04L 41/16* (2013.01); *H04L 45/02* (2013.01); *H04L 45/121* (2013.01); *H04L 45/48* (2013.01); *H04W 40/02* (2013.01); *H04W 52/02* (2013.01); *H04L 41/14* (2013.01); *H04W 84/18* (2013.01)

(58) Field of Classification Search
CPC ......... H04L 67/12; H04L 45/48; H04L 45/02; H04L 45/121; H04L 45/00; H04L 41/0806; H04L 41/12; H04L 41/14; H04W 52/02; H04W 84/18; H04W 40/02
See application file for complete search history.

(56) References Cited

U.S. PATENT DOCUMENTS

| 7,228,263 B2 | 6/2007 | Khanna et al. |
| 7,299,354 B2 | 11/2007 | Khanna et al. |
| 7,502,619 B1 * | 3/2009 | Katz ........................ G01S 5/02 455/456.5 |
| 7,587,750 B2 | 9/2009 | Zimmer et al. |
| 7,818,555 B2 | 10/2010 | Cai et al. |
| 7,818,560 B2 | 10/2010 | Li et al. |
| 7,856,551 B2 | 12/2010 | Cai et al. |
| 7,984,250 B2 | 7/2011 | Steinbrecher et al. |
| 8,144,717 B2 * | 3/2012 | Blange ................... H04L 45/26 370/395.2 |
| 8,386,618 B2 | 2/2013 | Bailey et al. |
| 9,389,668 B2 | 7/2016 | Zhou et al. |
| 2009/0016251 A1 * | 1/2009 | Adams .............. H04W 52/0229 370/311 |

(Continued)

*Primary Examiner* — Ramy M Osman
(74) *Attorney, Agent, or Firm* — Jordan IP Law, LLC

(57) ABSTRACT

An embodiment of network coordinator apparatus may include a node provisioner to provision each of a plurality of low power nodes, a node associater to create a first association for each of the plurality of lower power nodes, and a node coordinator communicatively coupled to the node provisioner and the node associater to coordinate the plurality of lower power nodes.

23 Claims, 13 Drawing Sheets

(56) References Cited

U.S. PATENT DOCUMENTS

| | | | |
|---|---|---|---|
| 2009/0198806 A1* | 8/2009 | Kim | H04L 41/04 709/222 |
| 2009/0325486 A1* | 12/2009 | Kim | H04W 72/082 455/41.2 |
| 2011/0023025 A1* | 1/2011 | Eldering | G06F 3/0625 718/1 |
| 2013/0021967 A1* | 1/2013 | Hwang | H04W 16/14 370/328 |
| 2013/0089003 A1* | 4/2013 | Liang | H04L 67/12 370/255 |
| 2013/0154693 A1* | 6/2013 | Moeglein | H04W 52/0229 327/143 |
| 2014/0254433 A1* | 9/2014 | Abe | H04L 41/12 370/256 |
| 2015/0127122 A1* | 5/2015 | Kwon | H04W 52/0254 700/22 |
| 2017/0019861 A1* | 1/2017 | Rubenstein | H04L 45/26 |
| 2019/0007496 A1* | 1/2019 | Khanna | H04L 41/12 |

* cited by examiner

Beacon - not received

Beacon – Received beacon and synchronized but yet to transmit – Tier 0

Beacon – Received beacon and synchronized but yet to transmit – Tier 1

Beacon – Received beacon and synchronized but yet to transmit – Tier 2

Beacon – Received beacon and synchronized but yet to transmit – Tier 3

Beacon - TX

Beacon – Received beacon and synchronized and transmitted

Beacon – Received beacon and synchronized and transmitted

Alive msg – Received from children but not yet transmitted up

Alive msg – transmitted to parent

Alive msg – previously transmitted to parent

COORDINATOR FOR LOW POWER SENSOR NETWORK WITH TREE OR STAR TOPOLOGY

TECHNICAL FIELD

Embodiments generally relate low power sensor networks. More particularly, embodiments relate to a coordinator for a low power sensor network with a tree topology or a star topology.

BACKGROUND

Low power sensor-nodes may be utilized in a wide variety of applications. The shipping industry may use low power sensor-nodes to track and monitor the shipment of goods.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
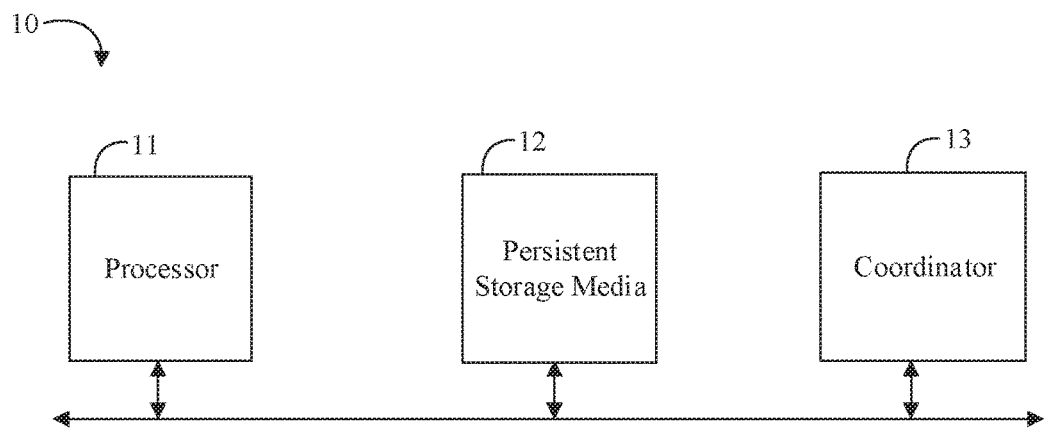
FIG. 1 is a block diagram of an example of an electronic processing system, according to an embodiment.

Turning now to FIG. 1, an embodiment of an electronic processing system 10 may include a processor 11, persistent storage media 12 communicatively coupled to the processor 11, and a coordinator 13 communicatively coupled to the processor 11 to coordinate a plurality of low power nodes. The coordinator 13 may be configured to provision each of the plurality of low power nodes, create a first association for each of the plurality of lower power nodes, and manage the plurality of lower power nodes. In some embodiments, the coordinator 13 may create a tree topology between the coordinator 13 and the plurality of low power nodes. To create the tree topology, for example, the coordinator 13 may be configured to analyze the first unoptimized association for information related to one or more of residual battery capacity, signal strength, and data redundancy for each of the low power nodes, and create a subsequent (e.g., improved or optimized) association for each of the plurality of lower power nodes based on the analysis. In some embodiments, the system 10 may include machine learning elements to improve or optimize the tree topology when creating the subsequent association.

Alternatively, in some embodiments, the coordinator 13 may be configured to create a centralized star topology between the coordinator 13 and the plurality of low power nodes. In the star topology, for example, the coordinator 13 may communicate with each of the plurality of low power nodes on a same channel. In the various embodiments described herein, the lower power nodes and/or other network nodes may be networked either wired or wirelessly. In particular, one or more network nodes may be wired with electrically conducting or optical connections in any of the various embodiments described herein.

Embodiments of each of the above processor 11, persistent storage media 12, coordinator 13, and other system components may be implemented in hardware, software, or any suitable combination thereof. For example, hardware implementations may include configurable logic such as, for example, programmable logic arrays (PLAs), field programmable gate array (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent storage media 12 may store a set of instructions which when executed by the processor 11 cause the system 10 to implement one or more components, features, or aspects of the system 10 (e.g. the coordinator 13, etc.).

Figure 2:
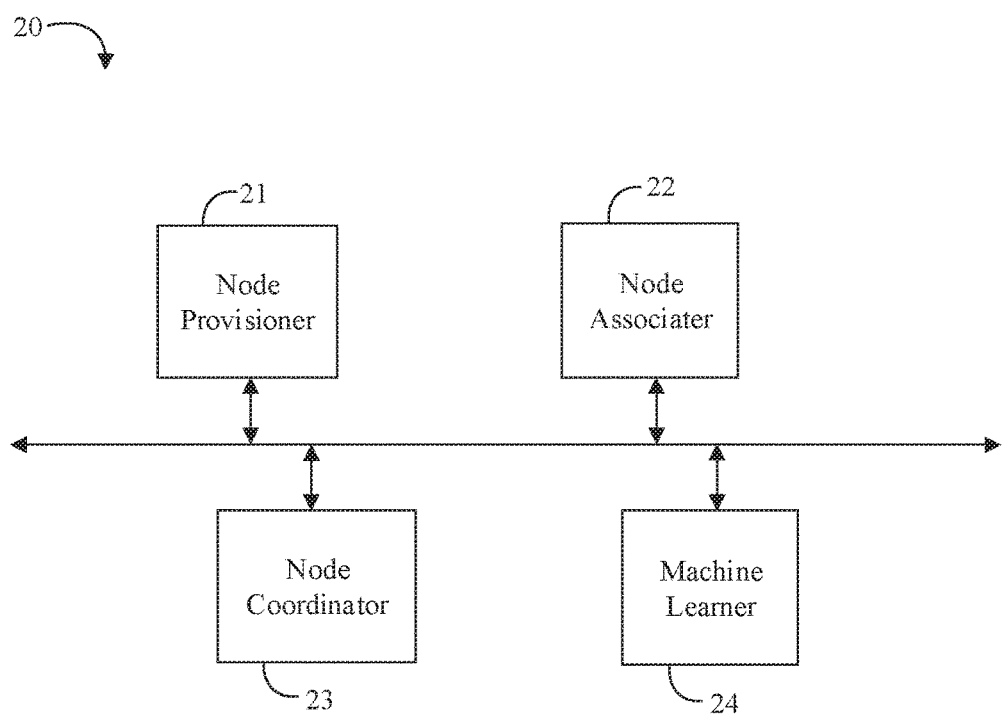
FIG. 2 is a block diagram of an example of network coordinator apparatus according to an embodiment.

Turning now to FIG. 2, an embodiment of a network coordinator apparatus 20 may include a node provisioner 21 to provision each of a plurality of low power nodes, a node associater 22 to create a first association for each of the plurality of lower power nodes, and a node coordinator 23 communicatively coupled to the node provisioner 21 and the node associater 22 to coordinate the plurality of lower power nodes. In some embodiments, the node coordinator 23 may be configured to create a centralized star topology between the node coordinator 23 and the plurality of low power nodes. In the star topology, for example, the node coordinator 23 may communicate directly with each of the plurality of low power nodes on a same channel.

In some embodiments, the node coordinator 23 may be configured to create a tree topology between the node coordinator 23 and the plurality of low power nodes. To create an improved or optimized tree topology, for example, the node coordinator 23 may analyze the first (e.g., unoptimized or rudimentary) association based on one or more of residual battery capacity, signal strength, and data redundancy for each of the low power nodes, and create a subsequent (e.g., improved or optimized) association for each of the plurality of lower power nodes based on the analysis. Some embodiments may further include a machine learner 24 communicatively coupled to the node coordinator 23 to provide the subsequent association based on the first association and one or more of residual battery capacity, signal strength, and data redundancy for each of the low power nodes.

Embodiments of each of the above node provisioner 21, node associater 22, node coordinator 23, machine learner 24, and other components of the apparatus 20 may be implemented in hardware, software, or any combination thereof. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
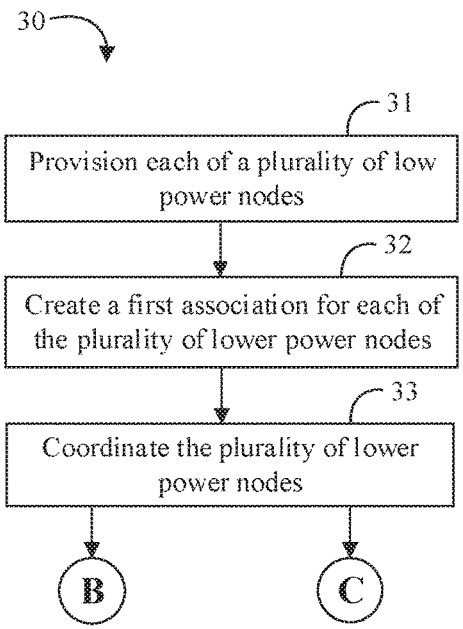
FIGS. 3A to 3C are flowcharts of an example of a method of coordinating low power nodes according to an embodiment.
Figure 3B:
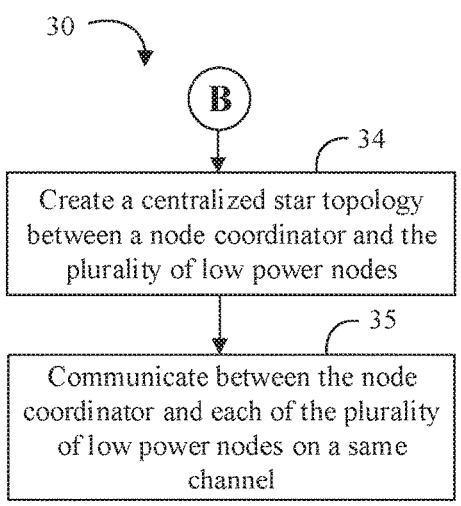
Figure 3C:
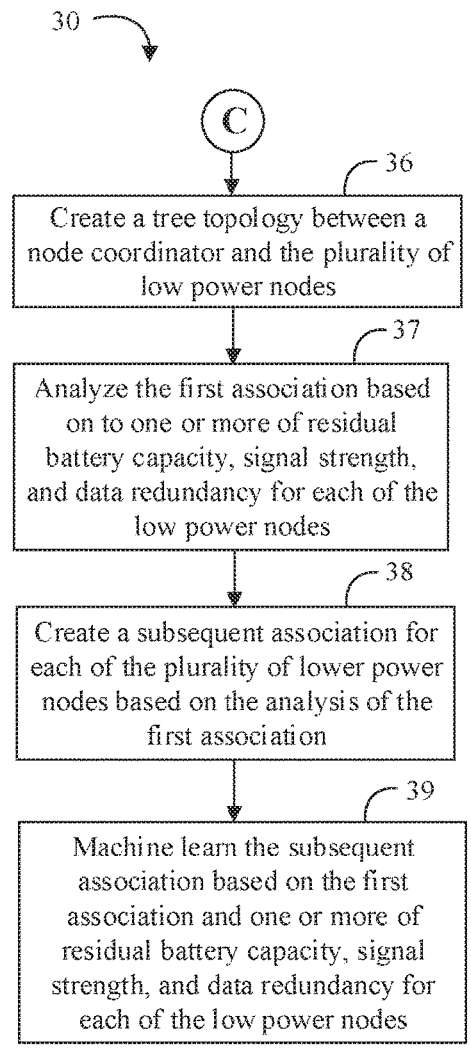

Turning now to FIG. 3, an embodiment of a method 30 of coordinating low power nodes may include provisioning each of a plurality of low power nodes at block 31, creating a first association for each of the plurality of lower power nodes at block 32, and coordinating the plurality of lower power nodes at block 33. Some embodiments may further include creating a centralized star topology between a node coordinator and the plurality of low power nodes at block 34, and communicating directly between the node coordinator and each of the plurality of low power nodes on a same channel at block 35.

Some embodiments of the method 30 may include creating a tree topology between a node coordinator and the plurality of low power nodes at block 36. For example, the method 30 may also include analyzing the first unoptimized or rudimentary association based on one or more of residual battery capacity, signal strength, and data redundancy for each of the low power nodes at block 37, and creating a subsequent optimized association for each of the plurality of lower power nodes based on the analysis of the first association at block 38. Some embodiments may further include machine learning the subsequent association based on the first association and one or more of residual battery capacity, signal strength, and data redundancy for each of the low power nodes at block 39. For example, some embodiments may utilize machine learning to optimize the subsequent association based on the information gathered regarding the node to node RSSI, node battery capacity, data redundancy, and tree network constraints, during the first association.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages. For example, the method 30 may be implemented on a computer readable medium as described in connection with Examples 18 to 23 below. For example, embodiments or portions of the method 30 may be implemented in applications (e.g. through an application programming interface (API)) or driver software running on an operating system (OS).

Tree Topology Examples

Some embodiments may advantageously create a tree network for a dense, low-power wireless sensor network. Some embodiments may provide long-term data collection from a multitude of battery-operated sensor-nodes (e.g. connected through wireless medium) that may or may not have direct wireless connectivity to the data collector (e.g., a gateway). For example, some embodiments may use a centrally intelligent entity (e.g., a gateway device or a cloud service) that may configure an improved or optimized power/signal/data sub-trees in a tree-topology in a dense sensor network where collection trees may operate on a time-division multiplexing (TDM) approach with constraints on the depth of tree as well as the number of child-nodes on each sub-branch of tree.

Some embodiments of a method of coordinating low power nodes may start with sensor-node preparation. For example, the sensor-nodes may be prepared with pre-defined slots (e.g., numbering from 1 to N, where N is the total number of sensor-nodes in a network). After sensor-node preparation, discovery may be performed. For example, discovery may utilize a parent-child flooding scheme where each potential parent may synchronize to its own selected parent beacon at Time "T" (to which it may listen). These parents may then beacon to its future children upon a randomly selected slot (e.g., from the sensor-node preparation) at time $(N-Tp+Ts)*Tk$ (where Tk=time period (in ms) where node is awake during its slot period; Tp=the parent slot number; and Ts=slot allocation number for the child sensor-node). After discovery, child-to-parent binding may be performed where each sensor-node may select a potential parent based on received signal strength indicator (RSSI) information received during discovery.

After child-to-parent binding, temporary path discovery may be performed. For example, after the forward flooding is completed (e.g., based on termination criteria) in the discovery phase, each child-node may start transmitting the RSSI information in the reverse order at its allocated slot (e.g., allocated at the sensor-node preparation phase). The other nodes may listen and record any child identifiers (IDs) that have chosen it to act as the node's parent. Then the potential parents may transmit the information of its child-ID, RSSI information of children's neighbors, and its own parent-ID at time (N−Ts+Tp)*Tk. The process may take 2*N*Tk*M, where M is the depth of the network (maximum number of levels/tiers in the network). For example, if all the nodes could be discovered with M=4 levels and N=20 nodes with a time-period of Tk=10 ms, then the temp-discovery process may complete in 2*20*10*4=1600 ms (1.6 seconds).

Advantageously, some embodiments may include path modification to improve or optimize the tree network topology. For example, a central agent may construct an N×N matrix with the mutual RSSI information between reported nodes recorded for performing analysis on the initial discovered path to modify or optimize the future path. In some embodiments, path modification may include a learning process to simulate a number of potential paths and choose an improved or optimal path based on residual battery capacity, signal strength, reduction of data redundancy, etc. This information may be traversed through the temporary path discovered during the temporary path discovery phase. Some embodiments may alternatively, or additionally, utilize machine learning elements to modify the path.

Based on the results of the path modification phase, some embodiments may create a new, improved or optimal tree network path. For example, the path information from the path modification phase may cause one or more of the nodes to update its information. For example, a node may update one or more of its parent slot number (e.g., when it will receive a beacon), its own slot number (e.g., when it should transmit to the parent node) and its children slot numbers (e.g., when it should listen to its children).

After new paths have been created, data collection may be initiated. The slots may be optimized in a manner such that the collection trees may operate by completing the collection from one tree to another and optimized for bottom-to-top collection. A time-sync process may also be performed where time may be synchronized from parent to child by reversing the slot order (N-SlotID). The time-sync process may keep the timings of each sensor-node synchronized. After configuration of the sensor-node network is complete, each sensor-node may send the sync beacon in its allocated slot that propagates to the leaf sensor-nodes. Each node may transmit the sensor data through its allocated slots towards the gateway.

Some low power approaches may use the contention slots in a manner that may not work very well with dense sensor-node activity where most of the sensor-nodes are within the communication range. Furthermore, these approaches may put ample burden (e.g., intelligence) on the sensor-nodes to create their own route which may require knowledge of routing information and storing routing trees. Additionally, optimal and/or power-efficient routes may not get created because the individual nodes don't have complete view of the platform. Advantageously, some embodiments may use a centrally intelligent process that may improve or optimize the paths based on battery capacity, signal strength of node relative to parent and children, and/or redundancy in data collection (e.g., which may be an artifact of compressive sensing). Some embodiments may put constraints in the system related to the tree depth and width to take advantage of machine-learning (ML) to create improved or optimal paths that can fulfill the performance requirements while keeping the battery usage to minimum.

Figure 4:
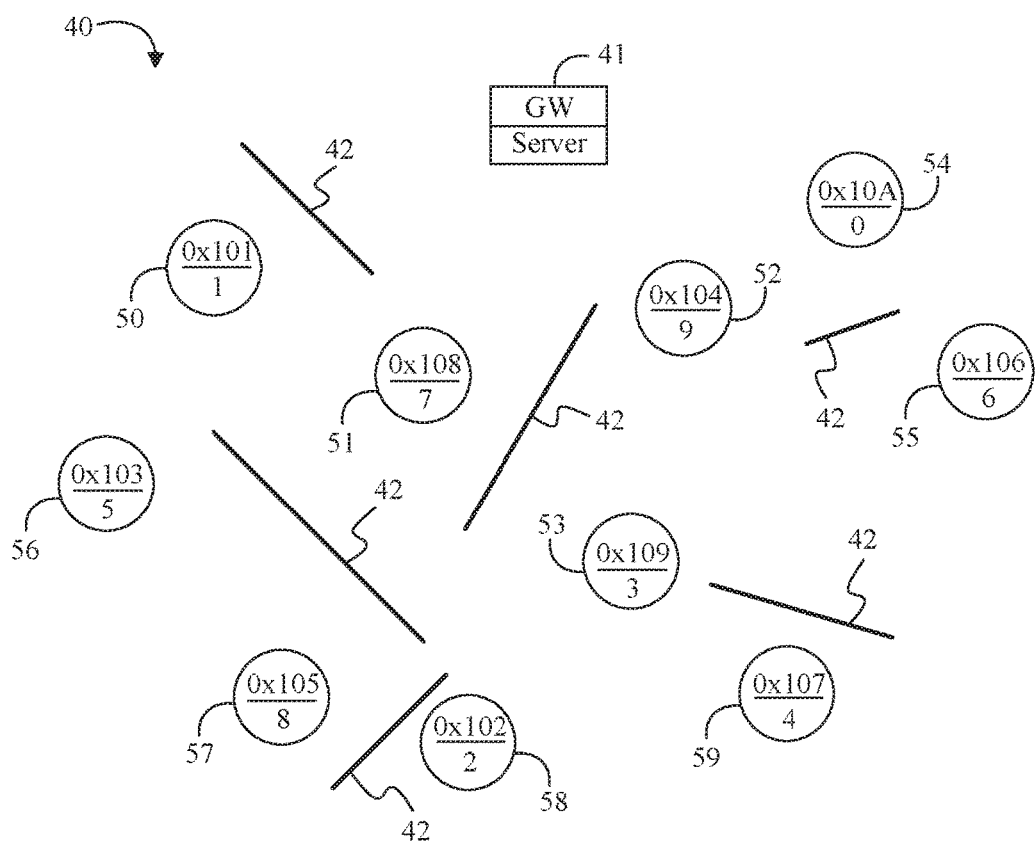
FIG. 4 is an illustrative diagram of an example of a low power sensor network environment in a provisioning phase according to an embodiment.

Turning now to FIG. 4, an embodiment of a low power sensor network environment 40 may include a network coordinator system 41 and a plurality of nodes 50 through 59. Several RF obstructions/obstacles 42 in the environment 40 may affect the signal strength between the nodes and the system 41, as well between one node and another node. For example, the network coordinator system 41 may include a gateway (GW) and/or server. As illustrated, the text above the line inside the nodes may represent a client ID for the node while the text under line inside the nodes may represent a provisional slot ID for the node. In a provisioning phase, all of the nodes may be given a random transmission (TX) slot id (SID). For example, the node 50 may have a client ID of 0x101 and may have a provisional SID of 1 (e.g. which may be given during near-field communication (NFC) provisioning).

Figure 5A:
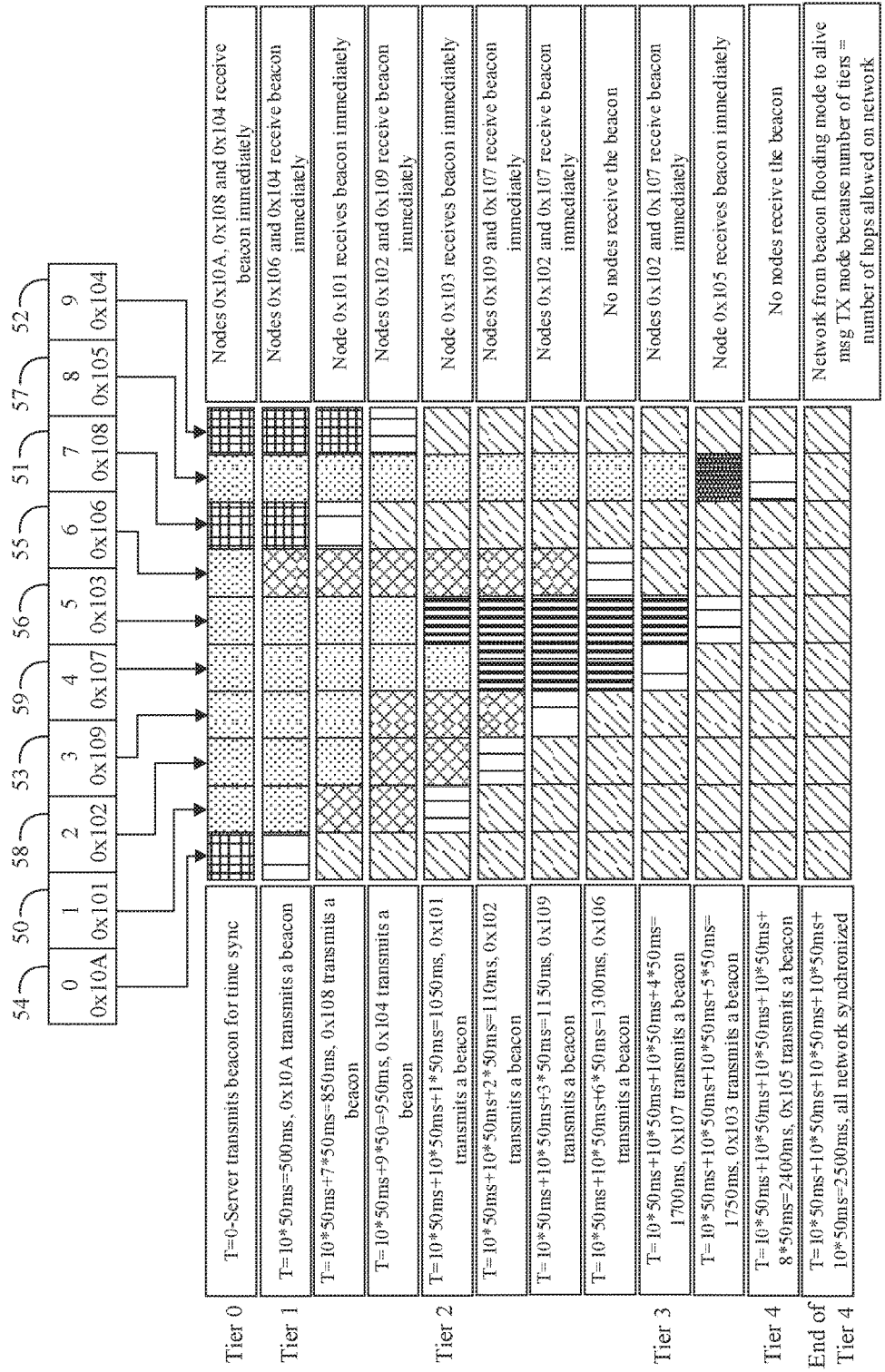
FIGS. 5A to 5B are illustrative diagrams of an example of a first network discovery phase according to an embodiment.
Figure 5B:
Figure 5B:
Figure 5B:
Figure 5B:
Figure 5B:
Figure 5B:
Figure 5B:

Turning now to FIGS. 5A to 5B, a first portion of a network discovery phase may include top-down beacon flooding. Each row may correspond to actions, activities, and/or responses at different time points. The leftmost column may indicate the time point and transmission activity while the rightmost column may indicate reception activity. The ten columns in between the leftmost and rightmost columns may correspond to nodes 50 through 59 and the activity/status of the node may be represented by a hatch pattern, which may be understood with reference to FIG. 5B.

Figure 6A:
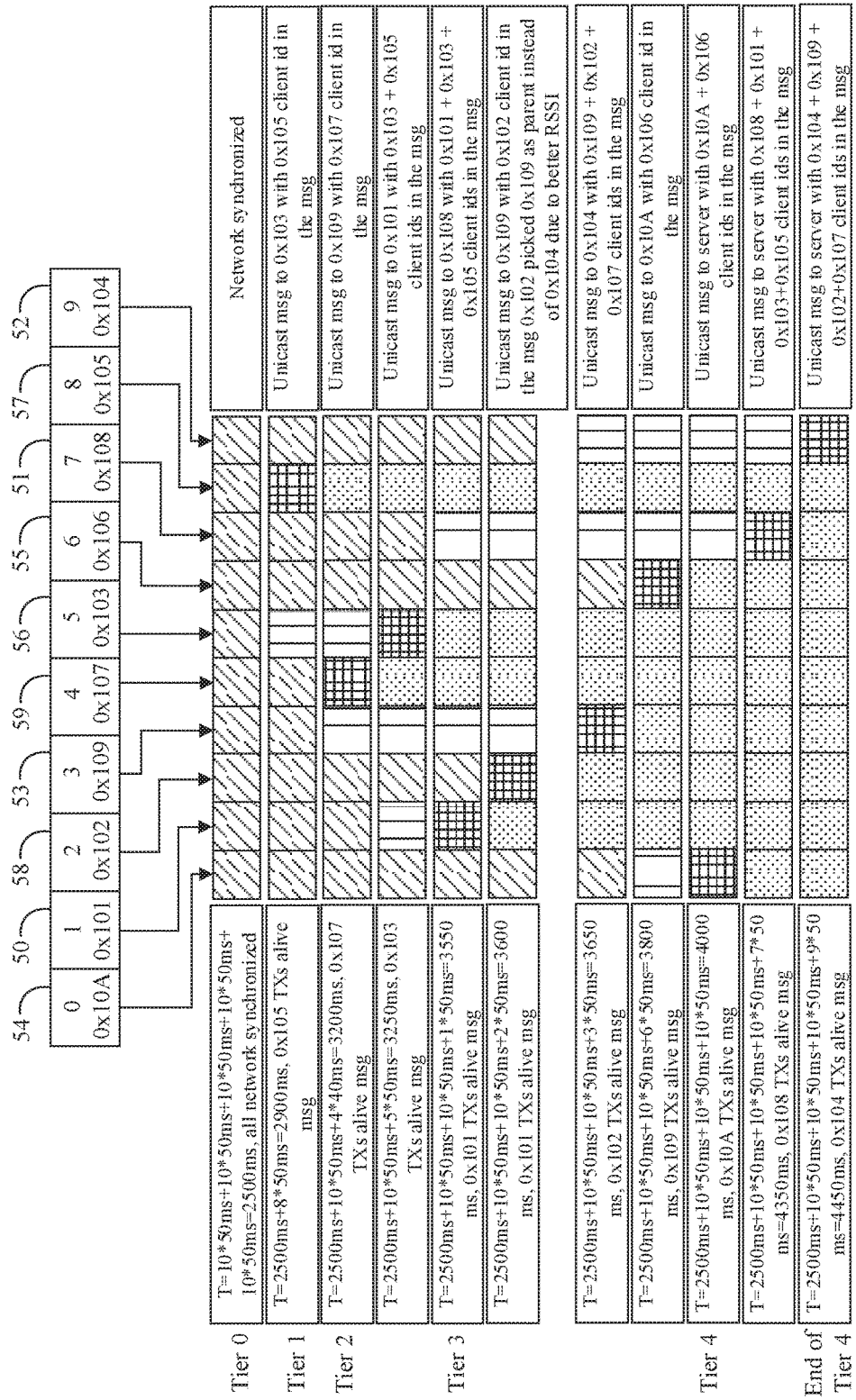
FIGS. 6A to 6B are illustrative diagrams of an example of a subsequent network discovery phase according to an embodiment.
Figure 6B:
Figure 6B:
Figure 6B:
Figure 6B:

Turning now to FIGS. 6A to 6B, after the beacon flooding is complete a subsequent portion of the network discovery phase may include alive message relays to the network coordinator system 41. The subsequent portion of the network discovery phase may start with Tier 5 client nodes transmitting to their parent nodes and subsequently getting relayed up to the server (e.g., a bottom-up process). The leftmost column may indicate the time point and alive message activity while the rightmost column may indicate other activity. The ten columns in between the leftmost and rightmost columns may correspond to nodes 50 through 59 and the activity/status of the node may be represented by a hatch pattern, which may be understood with reference to FIG. 6B.

Figure 7A:
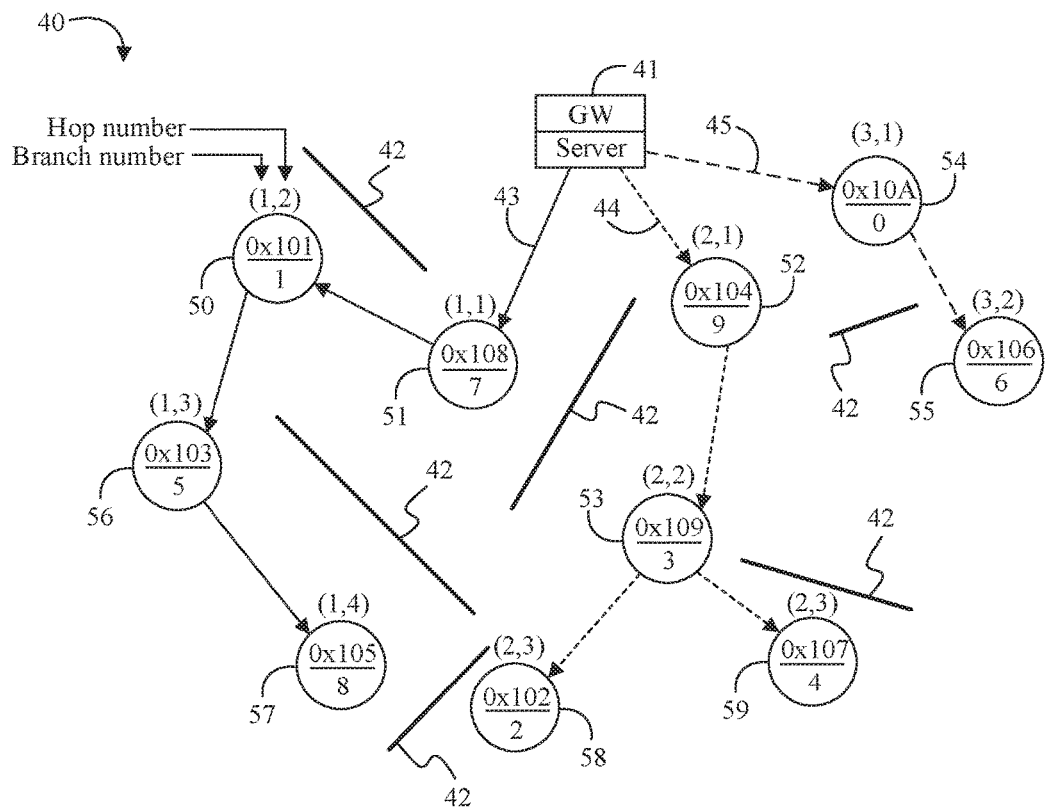
FIGS. 7A to 7B are illustrative diagrams of the example low power sensor network environment from FIG. 4 in a first association phase according to an embodiment.
Figure 7B:
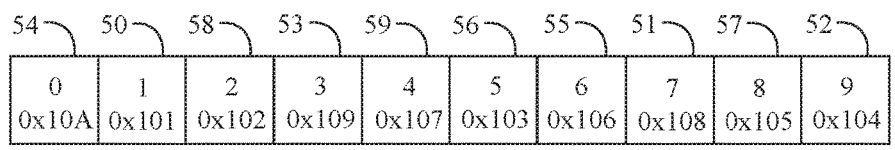

Turning now to FIGS. 7A to 7B, after the alive message transmission is complete and all nodes are accounted for, an association phase may begin. In a first association phase, a first branch 43 (e.g., branch number 1) may include a first hop (e.g., hop number 1) from the system 41 to node 51, a second hop (e.g., hop number 2) from node 51 to node 50, a third hop (e.g., hop number 3) from node 50 to node 56, and a fourth hop (e.g., hop number 4) from node 56 to node 57. A second branch 44 may include a first hop from the system 41 to node 52, a second hop from node 52 to node 53, and multiple third hops from node 53 to child nodes 58 and 59. A third branch 45 may include a first hop from the system 41 to node 54, and a second hop from node 54 to node 55. Tier 1 may include nodes 51, 52, and 54. Tier 2 may include nodes 50, 53, and 55. Tier 3 may include nodes 56, 58, and 59. Tier 4 may include node 57. FIG. 7B shows the original, randomly provisioned SIDs with their corresponding node IDs.

In the association phase, there may be two example types of paths including initial discovery paths and centrally optimized paths. In a rare situation, the initial paths may be similar to or the same as the subsequently optimized paths. In general, however, the initial discovery paths may be created to enable delivery of the WSN attributes and characteristics with respect to each sensor node. The initial discovery paths may also enable the delivery of new optimized paths (e.g., which may then be used to create newer optimized paths, and so on). Determining an optimized path may involve using an algorithm to improve or optimize the route based on RSSI, node battery capacity, network constraints like number of hops or tier in the network, number of leaf nodes per relay and data redundancy. After the attribute data related to each sensor node (e.g., RSSI relative to other sensor nodes, battery, etc.) is delivered, a central entity (e.g., the GW system 41 in the foregoing example embodiment) may use the learned information to create a model of improved or optimal paths (e.g., using one or more of the ML variants like genetic algorithm (GA), Djikstra, etc.) and the optimal paths may be delivered using the current established paths. After the newly constructed model dissipates through the sensors, each sensor may then connect to its new parent and establish a new tree network.

Figures 8A, 8B:
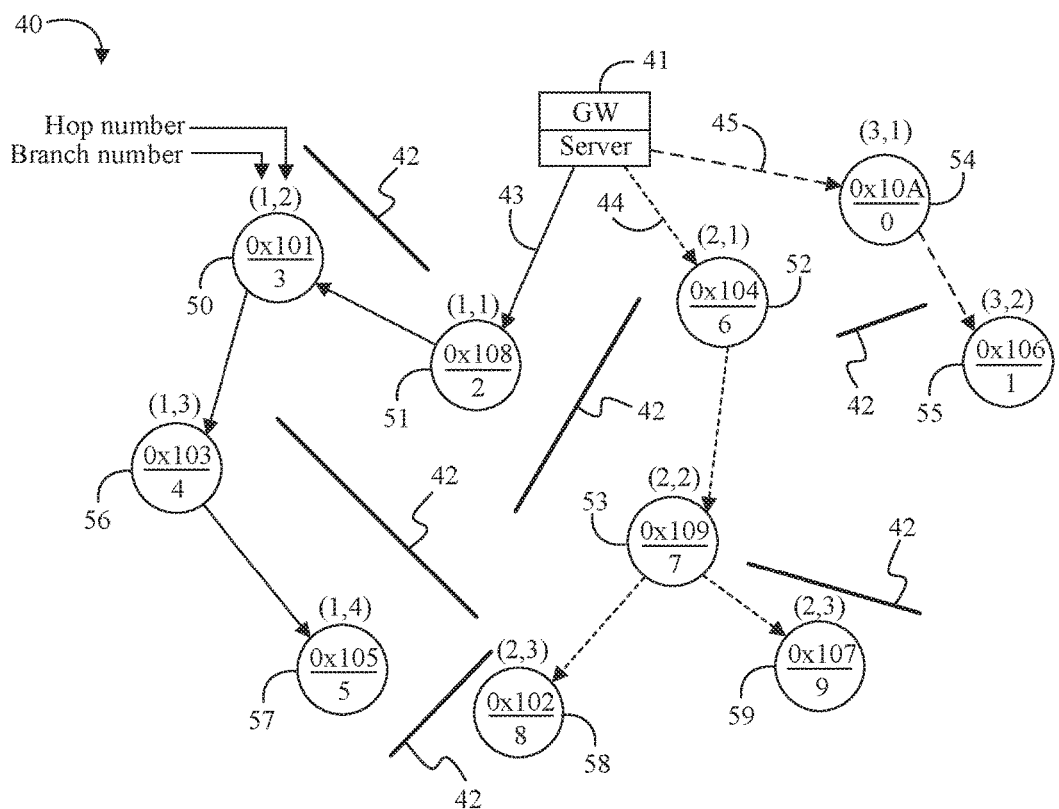
FIGS. 8A to 8B are illustrative diagrams of the example low power sensor network environment from FIG. 4 in a subsequent association phase according to an embodiment.

Turning now to FIGS. 8A to 8B, some embodiments may advantageously create a new, subsequent association for the SIDs in a subsequent association phase. The SID may allow a collision free discovery of the network. Each client may be allowed to transmit within the slot that corresponds to the SID, and other clients may listen during that period and measure the received signal strength that may be used by the receiving client to decide if it should choose the SID as its parent during initial path discovery. Optimized or rearranged time slots may allow for a node to transmit after it receives the data or alive status from all its leaves, and may support a systematic top down beacon flow and bottom up data flow. For example, some embodiments may improve or optimize the SIDs associated with each of the node based on the vertical branches. FIG. 8B shows an example subsequent association where the SIDs are re-organized in accordance with the respective branches 43, 44, and 45.

Some embodiments may be useful for various industrial internet-of-things (IoT) applications. For example, some embodiments may create a contention-free network with large number of nodes that may be useful for shipping logistics, asset tracing, body-area-networks, smart-homes, etc. In some shipping and logistics environments, for example, a low-power, dense sensor network may be an important technology. In that environment, some embodiments may allow sensor-nodes to collectively accumulate the sensor information and find an optimal path (e.g., and time slot) when it may be more or most effective to transmit the data. Some embodiments may improve the shipping, tracking, and deliverable of perishable goods. Some embodiments may improve detection/prevention of stolen cargo. Some embodiments may improve detection/prevention of supply chain disruption. Some embodiments may be particularly useful for shipping/tracking in a power-optimized manner for long periods of time (e.g., a few days to 3-4 months).

Machine Learning Examples

Some embodiments of a network coordinator apparatus may include a machine learning engine to provide one or more of path modification information and SID modification information based on node information. For example, the node information may include one or more of battery information, signal information, parent information, child information, data collection information, etc. For example, the machine learning engine may be configured to identify a path, to categorize a path, to modify a SID, modify a parent SID, and/or to modify a child SID based on the node information. Some embodiments may further include an inference engine communicatively coupled to the machine learning engine to provide the path/SID information and/or to modify the path/SID information. For example, the machine learning engine may be provided from the result of a machine learning (ML) preparation/training for a particular sensor-node set and/or network environment. For example, the ML engine may be integrated with or provide information to any of the various components/modules described herein to augment/improve the information and/or modifications from those modules (e.g., particularly the path modification/optimization).

Advantageously, some embodiments may provide a ML-based path optimizer. A problem with taking data from a multitude of sensor-nodes is that it may be difficult to make a good decision about what to do with all the data to identify an improved/optimized set of paths. Some calculations/predictions may be straightforward, but may not always be the most optimized. Advantageously, some embodiments may use machine learning to take the multitude of data as an input to produce a function which can identify an improved or optimized set of paths. In accordance with some embodiments, one benefit with applying machine learning to optimize the paths is that a variety of sensor-nodes may be used without designing the sensors for this specific purpose. The system may provide as much information as might be available to prepare/train the ML and the output model may decide what is best for a particular situation. The data to the ML preparation/training may be unfiltered.

The sensor data and other data (e.g., CPU/GPU data, context data, etc.) may be provided to a ML unit to prepare/train the ML unit, and the result of the ML unit may be used to improve or optimize the path(s). The input data may also include the current path data that the network coordinator system may provide to the ML.

In some embodiments, the ML may include a deep learning unit. The ML may also include a neural network which gets trained and provides a decision tree. Other examples of a suitable ML include decision tree learning, association rule learning, inductive logic programming, support vector machines, clustering, Bayesian networks, reinforcement learning, representation learning, similarity and metric learning, rule-based machine learning, transfer learning, and/or learning classifier systems. Any type of ML may produce an ML result (e.g., an output function, model, decision tree, etc.) which may improve the identification of a network path in accordance with some embodiments.

The ML result may be the result of a one-time preparation/training of the ML for a given sensor-node set and processing environment. In some embodiments, a continuous/regular improvement of the ML result may be provided by regular re-training or updating the ML for a new ML result on a regular or continuous basis (e.g., based on comparison of the predictions to actual information, based on changes in the processing environment, based on changes on the sensor-node set, etc.). Some embodiments may leverage the availability of an inference engine which may be included with many devices. For example, some electronic systems may include an inference engine. If an inference engine is available, the ML result may act as a classifier and the inference engine may be used to improve/optimize the paths. Some inference engines may be able to update the learning states (e.g., compare an identified optimization against measured results to improve future decision making) during the use or deployment stage.

In general, preparing a ML result may be time-consuming and interactive or regular re-training may not be practical. Some embodiments, may prepare the ML with a particular set of sensor-nodes to get a ML result which may run on a particular inference engine without real time updates. In some embodiments, the sensor-node set may change dynamically. For example, varying numbers of sensor-nodes and obstacles may be present in different environments. The process for preparing the ML path optimizer may generally be to train/prepare the ML with the new sensor-node set to get a new ML result for the ML path optimizer, deploy the ML path optimizer, and then run the ML path optimizer with the new sensor-node set. In some embodiments, the training may not be performed in real-time. In some embodiments, the ML result may be pre-trained and just deployed where compatible. For example, a vendor may provide a classifier for its applications on different devices, with different sensor-node sets, and/or may custom train and make the custom result available to the network coordinator system (e.g., by download). Some embodiments of a ML engine may aggregate information or data to improve results for path optimization (e.g., crowd source the information).

Some embodiments may train with a larger sensor-node set with various sensor-nodes unavailable during the training so that the ML result can deal with the varying number of sensor-nodes. Several classifiers may also be pre-trained for common combinations (e.g., different types of devices that may be brought into the environment). During the training, data sets may be run with varying numbers of the sensor-nodes available.

Star Topology Examples

Some embodiments may advantageously provide a wireless sensor network protocol for power efficient network management and improved or optimal data transmission. Resource-limited pervasive monitoring, and the IoT may be challenged by tradeoffs in connectivity, intelligence, and lifespan. Some embodiments may enable technologies for wireless sensor networks (WSNs) and may pair one or more of low-power hardware, energy-efficient software and protocols, and/or power management techniques.

Across diverse applications, low-power technologies and network protocols may provide pervasive monitoring and the evolving IoT. Some applications such as the shipping industry, however, may demand that sensor-nodes must survive on a coin-cell battery for an extended period (e.g., 15 days minimum) while providing minute-to-minute anomaly alerts for remote analytics and control. Some embodiments may provide an end-to-end solution offering important status information throughout the shipping lifecycle by providing an integrative quick-deploy system to detect damage/theft in near real-time. Some embodiments may also provide a WSN scalable communication protocol. For example, a full-stack design may provide a rapid-deployable, self-configuring, and/or scalable wireless sensor network for low-duty-cycle pervasive monitoring in a small, low-cost form factor.

Other systems may provide segmented solutions which may exhibit costly overhead for resource-limited, pervasive networks and scalable/dense IoT. Some use cases, such as shipping and distribution may benefit from extremely low power, ease-of-use, compatibility, rapid-prototyping, and more. Advantageously, some embodiments may provide a near real-time WSN whose nodes may be 1) provisioned opportunistically (e.g., in a warehouse); 2) associated to an assigned network for transit; 3) observed in a managed mode during transit; and 4) exposed to change-of-custody, theft, damage, etc.

A wide-variety of low-power hardware may be available to satisfy diverse applications, but may be targeted to particular applications. Various software protocols may be directed to low power, such as BLUETOOTH LOW ENERGY (BLE), 6LOWPAN, and ZIGBEE PRO. Each aims to leverage channel hopping, reduce overhead from the IEEE 805.15.11 standard, and may provide guidelines for node-to-node communication for mesh and multi-hop routines. However, these protocols may restrict scalability and demand greater radio activity than may be practical for some dense low-power network use cases.

Some embodiments may provide a self-configuring, scalable, low-power wireless sensor network for an extended period (e.g., 15 days minimum) of pervasive sensing with a local coverage area (e.g., of up to 15 meters). Some embodiments may include a coordinator node to coordinate a centralized star topology network, in which edge nodes may communicate directly to the coordinator. The coordinator and edge nodes may be identified in terms of a local communication network, as server and client, respectively. The client nodes may be equipped with sensors on the edge of the network link to the server node coordinating the network. Some embodiments may interchange client node with edge or sensor-node.

For scalability and coexistence of networks, some embodiments may have the client nodes connected to a server node operating on the same channel. The nodes may transmit minimal information at assigned, calculated time-slots to organize channel occupancy through indexed TDM. TDM may reduce collisions, but may be challenged by time-synchronization among nodes.

Figure 9:
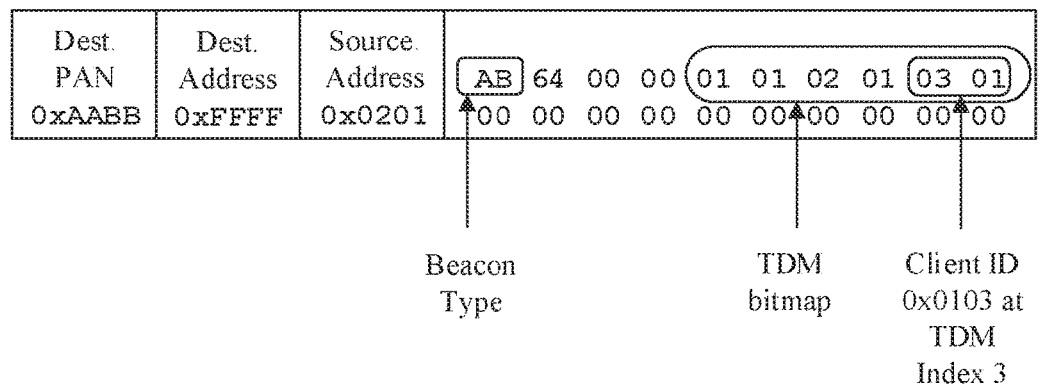
FIG. 9 is an illustrative diagram of a time-division multiplex (TDM) assignment according to an embodiment.

FIG. 9 shows an example TDM assignment in accordance with some embodiments. For example, the server node may periodically broadcast the association beacon with a TDM bitmapped sequence of all network client IDs in the assigned order until all nodes respond in their slot. An association beacon 90 may include a frame header AB, broadcast from the server at 0x0201 to all clients via a destination address 0xFFFF. The TDM bitmap may yield a slot ID of 3 for client 0x0103 (read right-to-left).

Each microcontroller's real-time-clock (RTC) may use a crystal oscillator that inherently exhibits frequency drift over time. The drift inevitably may compromise synchronization because the nodes must operate according to the dense TDM schedule. Furthermore, drift may occur on every node, yielding scenarios where a client and server may drift inversely. For time synchronization, in some embodiments, a guard band to radio activity may form a listening phase for mitigating offset.

Some embodiments may define client and server as roles (e.g., or node types) to form entities in an overall network, each operating across four modes including provisioning mode, association mode, managed mode, and recovery mode. Within each state and between any two states, the node may sleep until triggered to wake (e.g., by a timer). Every node may execute instructions quickly and only as necessary, prioritizing sleep to minimize duty cycle and radio time for longer lifespan. The operation modes may guide a client node state machine whose transitions may depend on local and network events.

In provisioning mode, for example, the node may be initialized with basic configurations to operate and join the network for association. Either programmed manually or by NFC, for example, each client node may receive its configurations, such as a unique device ID and the gateway ID (GWID) to which the node may associate. This network state may be chaotic by nature because the nodes need time-slots relative to each other.

After provisioning, the system may enter an association mode. Each node may frequently wake up to listen for the association beacon, why may be sent repeatedly from the server node until all clients check-in. Upon receiving the beacon, the client may synchronize its timers and retrieve its slot ID from the TDM bitmap, and then may respond in its slot. In this manner, the chaotic network may resolve into an organized TDM network. Preferably, this process completes quickly.

The managed mode may use periodic micro- and macro-frames as beacons to synchronize the network and exchange information, such as sensor data, configurations, or instructions. In each micro-frame, for example, the client may send a heartbeat/alive message, or anomaly data if any occurred since the last report. With similar structure, in each macro-frame (e.g., a larger period relative to the micro-frame) the client may report sensor anomalies and in-range samples for analytics.

If a client node loses synchronization or connectivity with the network, it may move to the recovery mode. Similar to the association mode, the client node may wake up more frequently to capture the beacon while the server drives the network in the managed mode.

In some embodiments, a packet structure may include a packet size that may vary depending on the attribute of the data being communicated (e.g., as indicated by a frame header). Flags in the frame header may indicate the type of content and instructions for the next micro-frame. The packet may contain only anomaly data, current data and anomaly data, or configuration data from the beacon via a micro-frame, a macro-frame, or a configuration packet structure.

Figure 10A:
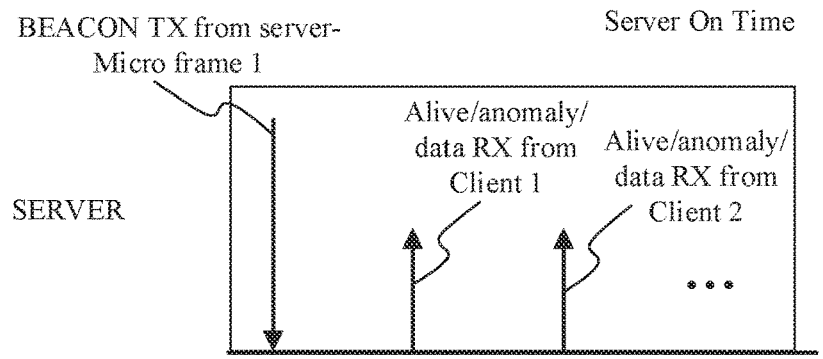
FIGS. 10A to 10C are illustrative diagrams of an example of a micro-frame according to an embodiment.
Figure 10B:
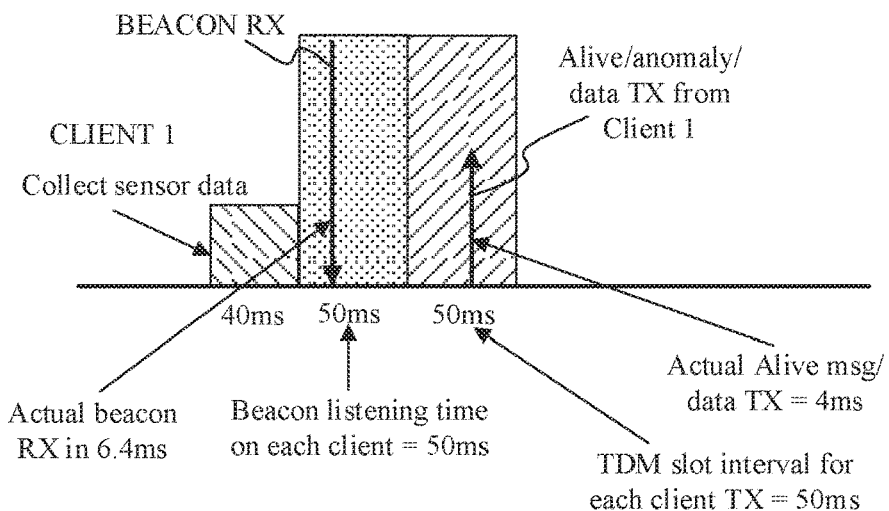
Figure 10C:
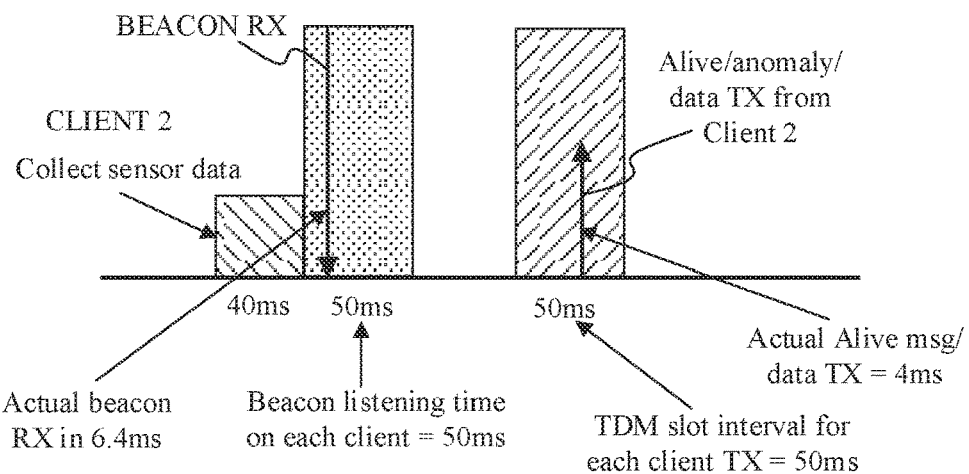

Turning now to FIGS. 10A to 10C, clients 1 and 2 may collect sensor data prior to a start of a micro-frame. Each client may listen for a beacon from the server. Client 1 may transmit its alive/anomaly/data information in a first time slot, while client 2 may transmit its alive/anomaly/data information in another time slot. As shown in FIG. 10A, the server transmits a beacon every micro-frame (time duration) during which each client sets its clock. Then each client wakes up during its time period and transmits the information related to heartbeat, anomalous behavior, etc. The communication may all controlled through allocated time-slots (TDM). As shown in FIG. 10B, client 1 may collect the sensor data, wait for the server beacon to reset its timer, and transmit the data at the time slot relative to the newly reset time (e.g., each slot may be fixed or variable) for a period of X ms (4 ms in this example). The time values should only be considered as examples because they may change due to accuracy, battery utilization constraints, etc. As shown in FIG. 10C, client 2 may operate similarly to client 1, except that client 2 transmits at a different time slot (e.g., each interval being 50 ms).

In some embodiments, the full stack may be divided by functional responsibility into three modules, implemented as software and/or hardware, including a server, a client, and a sensor. Advantageously, the modular approach may allow independent development and testing. The client module may run on client nodes equipped with sensors. However, the client module may not interface with the sensors directly, but rather through the sensor module. Thus, the client may be focused on network connection, configuration changes, forming messages with sensor packets, and backing up critical data to non-volatile memory. An example structure for the client's memory bank may house critical information for operation and backup, similar to the server module. When a beacon is received, the client module may identify from the frame header if the beacon is: 1) an association beacon with TDM assignments; 2) a regular beacon to synchronize the network; 3) a next-frame-is-macro beacon to force a macro-frame response; 4) a configuration beacon with a payload for the client module to parse and consume (such as channel ID) or pass to sensor module; 5) a calibration beacon informing the client to call the sensor module function for recalibration; 6) etc.

The server module may contain structures and functions specific to the server tasks. The server node may not need knowledge of client node configurations, structures, or data. The server module may reside on the server node, communicating with the GW and the clients of its wireless network. The server module may use four modes/states to control the operation including a handshake mode, provisioning mode, association mode, and managed mode. The server may first try to handshake with the GW device and setup the communication channel. Next, in the provisioning mode, the server may wait for configuration data from the GW. Then the server moves to the association mode in which it may broadcast the association beacon with TDM assignments for the client nodes. After all clients check-in, the server and clients are associated and may operate in the managed mode using beacons and frames. The server may record the status for all clients to inform local and up-chain decisions. Key parameters may include slot ID, battery level, RSSI, and number of lost beacons. For example, with 5 lost beacons (absent from check-in), the client may be considered lost and an alert may be sent to the GW. The server may also maintain a memory bank structure that houses important parameters in case of power loss or reboot. As the coordinator, a server node may need functionality to start the association/disassociation of client nodes, bidirectional communication with the clients and the GW, packetizing and parsing those communications, saving data to the RAM, appropriate beacon mechanism for synchronization and data transfer, etc. Timers and interrupts, for example, may be used to trigger transition between modes and functions in the server module.

The sensor module may be responsible for interacting with the sensor drivers for the client node. Once initialized, a sensor event handler may be used for sensor specific tasks such as read buffers, record anomalies, packetize data, handle events/interrupts, etc. If multiple anomalies occur for a sensor between reported frames, some embodiments may include maximum, minimum, and number of anomalous events. The sensor-nodes may need to be reconfigured on-the-fly, so each sensor driver may have a function for consuming the appropriate configuration data. Each type of sensor onboard the client may be enumerated (0, 1, 2, etc.), and the sensor module may cascade through all sensor drivers, switch cases, configurations, and other interactions.

Figure 11:
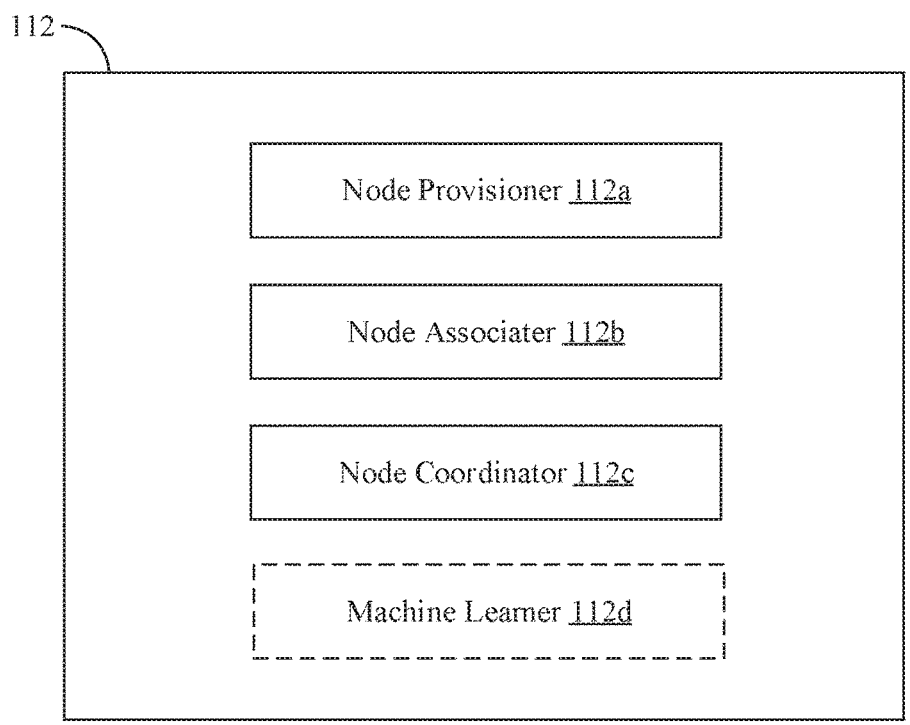
FIGS. 11 and 12 are block diagrams of other examples of network coordinator apparatuses according to embodiments.

FIG. 11 shows a network coordinator apparatus 112 (112a-112d) that may implement one or more aspects of the method 30 (FIGS. 3A to 3B), and/or the methods discussed in connection with the tree topology examples and/or the star topology examples. The network coordinator apparatus 112, which may include logic instructions, configurable logic, fixed-functionality hardware logic, etc., may be readily substituted for the various coordinators already discussed (e.g., coordinator 13 in FIG. 1, network coordinator apparatus 20 in FIG. 2, network coordinator system 41 in FIG. 4, etc.). A node provisioner 112a may provision each of a plurality of low power nodes. A node associater 112b may create a first association for each of the plurality of lower power nodes. A node coordinator 112c may coordinate the plurality of lower power nodes. In some embodiments, the node coordinator 112c may be configured to create a centralized star topology between the node coordinator 112c and the plurality of low power nodes. In the star topology, for example, the node coordinator 112c may communicate directly with each of the plurality of low power nodes on a same channel. In some embodiments, the node coordinator 112c may be configured to create a tree topology between the node coordinator 112c and the plurality of low power nodes. Some embodiments may optionally include a machine learner 112d to provide the subsequent association based on the first association and one or more of residual battery capacity, signal strength, and data redundancy for each of the low power nodes.

Figure 12:
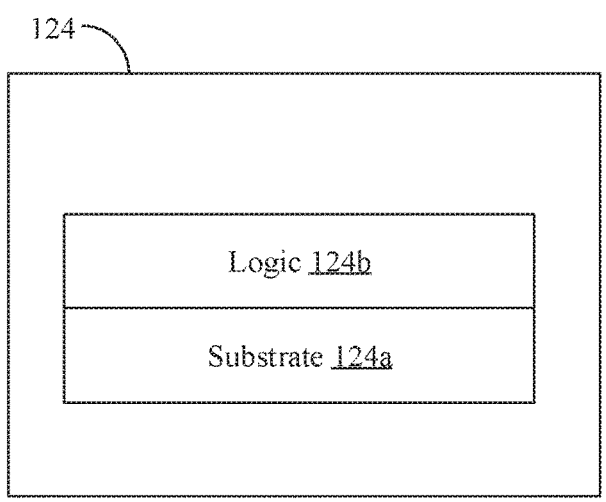

Turning now to FIG. 12, a network coordinator apparatus 124 (124a, 124b) is shown in which logic 124b (e.g., transistor array and other integrated circuit/IC components) is coupled to a substrate 124a (e.g., silicon, sapphire, gallium arsenide, etc.). The logic 124b may generally implement one or more aspects of the method 30 (FIGS. 3A to 3B), and/or the methods discussed in connection with the tree topology examples and/or the star topology examples. Thus, the logic 124b may provision each of a plurality of low power nodes, create a first association for each of the plurality of lower power nodes, and coordinate the plurality of lower power nodes. The logic 124b may also create a tree topology between a node coordinator and the plurality of low power nodes. For example, the logic 124b may analyze the first association based on one or more of residual battery capacity, signal strength, and data redundancy for each of the low power nodes, and create a subsequent association for each of the plurality of lower power nodes based on the analysis of the first association. The logic 124b may also be configured to machine learn the subsequent association based on the first association and one or more of residual battery capacity, signal strength, and data redundancy for each of the low power nodes. In some embodiments, the logic 124b may be configured to create a centralized star topology between a node coordinator and the plurality of low power nodes. For example, the logic 124b may be configured to communicate between the node coordinator and each of the plurality of low power nodes on a same channel.

Figure 13:
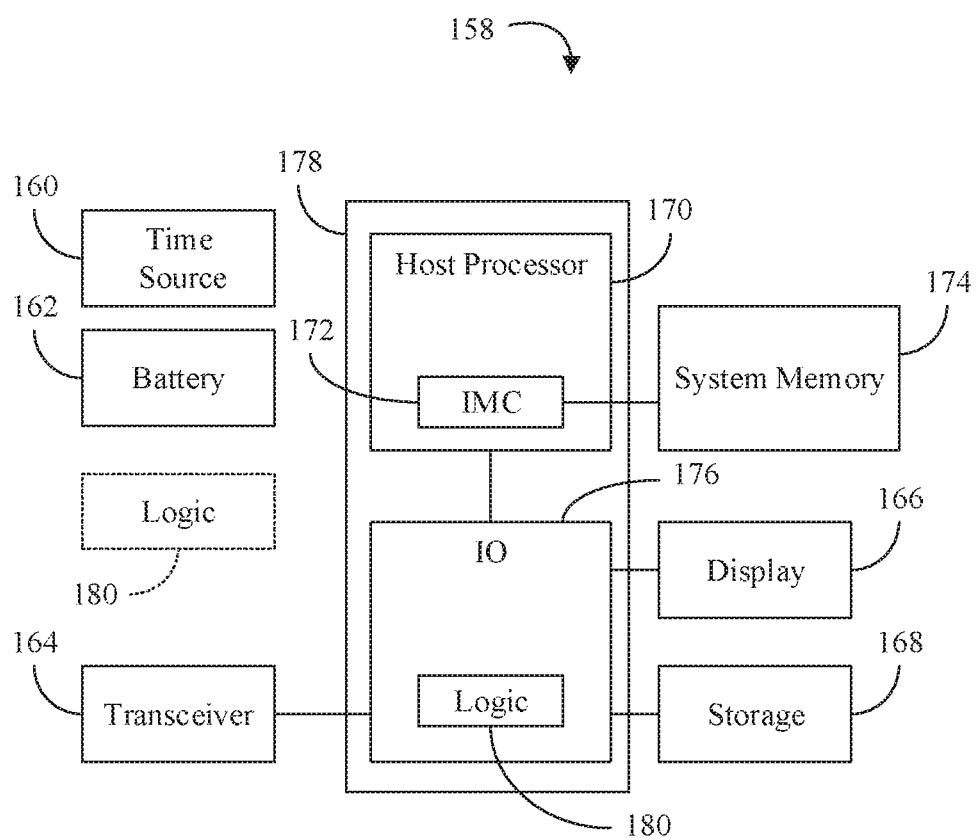
FIG. 13 is a block diagram of an example of a computing device according to an embodiment.

FIG. 13 shows a computing device 158 that may be readily substituted for one or more components of the various systems, apparatuses, platforms, and/or environments, already discussed. In the illustrated example, the device 158 includes a time source 160 (e.g., crystal oscillator, clock), a battery 162 to supply power to the device 158, a transceiver 164 (e.g., wireless or wired), a display 166 and storage 168 (e.g., hard disk drive/HDD, solid state disk/SSD, optical disk, flash memory, NAND memory, etc.). The device 158 may also include a host processor 170 (e.g., CPU) having an integrated memory controller (IMC) 172, which may communicate with system memory 174. The system memory 174 may include, for example, dynamic random access memory (DRAM) configured as one or more memory modules such as, for example, dual inline memory modules (DIMMs), small outline DIMMs (SODIMMs), etc. The illustrated device 158 may also include an input output (TO) module 176 implemented together with the processor 170 on a semiconductor die 178 as a system on chip (SoC), wherein the IO module 176 functions as a host device and may communicate with, for example, the display 166, the transceiver 164, the storage 168, and so forth. The storage 168 may include non-volatile memory (NVM) that stores one or more keys (e.g., MAC generation keys, encryption keys).

The system memory 174 may store instructions and/or the computing device 158 may include logic 180 that causes the computing device 158 to operate as a coordinator such as the various embodiments described herein. Thus, the instructions stored in the system memory 174 (e.g. when executed by the processor 170) and/or the logic 180 may cause the computing device 158 to provision each of a plurality of low power nodes, create a first association for each of the plurality of lower power nodes, and coordinate the plurality of lower power nodes. The instructions/logic 180 may further cause the computing device 158 to create a tree topology between a node coordinator and the plurality of low power nodes. For example, the instructions/logic 180 may cause the computing device 158 to analyze the first association based on one or more of residual battery capacity, signal strength, and data redundancy for each of the low power nodes, and create a subsequent association for each of the plurality of lower power nodes based on the analysis of the first association. The instructions/logic 180 may also cause the computing device 158 to machine learn the subsequent association based on the first association and one or more of residual battery capacity, signal strength, and data redundancy for each of the low power nodes.

Moreover, the instructions/logic 180 may also cause the computing device 158 to create a centralized star topology between a node coordinator and the plurality of low power nodes. For example, the instructions/logic 180 may cause the computing device 158 to communicate between the node coordinator and each of the plurality of low power nodes on a same channel. In one example, the time source 160 may be autonomous/independent from the controller in order to enhance security (e.g., to prevent the controller from tampering with cadence, frequency, latency and/or timestamp data). The logic 180 may also be implemented separately from the computing device 158. The display 166 may include any useful display device, such as a conventional mobile device display, tablet display, or other touch displays, and also simpler display devices such as numerical and digital letter displays that may present numbers or letters or a scrolling display of the same.

Additional Notes and Examples

Example 1 may include an electronic processing system, comprising a processor, persistent storage media communicatively coupled to the processor, and a coordinator communicatively coupled to the processor to coordinate a plurality of low power nodes, wherein the coordinator is further to provision each of the plurality of low power nodes, create a first association for each of the plurality of lower power nodes, and manage the plurality of lower power nodes.

Example 2 may include the system of Example 1, wherein the coordinator is further to create a tree topology between the coordinator and the plurality of low power nodes.

Example 3 may include the system of any of Examples 1 to 2, wherein the coordinator is further to analyze the first association for information related to one or more of residual battery capacity, signal strength, and data redundancy for each of the low power nodes, and create a subsequent association for each of the plurality of lower power nodes based on the analysis.

Example 4 may include the system of Example 1, wherein the coordinator is further to create a centralized star topology between the coordinator and the plurality of low power nodes.

Example 5 may include the system of Example 4, wherein the coordinator is further to communicate with each of the plurality of low power nodes on a same channel.

Example 6 may include a network coordinator apparatus, comprising a node provisioner to provision each of a plurality of low power nodes, a node associater to create a first association for each of the plurality of lower power nodes, and a node coordinator communicatively coupled to the node provisioner and the node associater to coordinate the plurality of lower power nodes.

Example 7 may include the apparatus of Example 6, wherein the node coordinator is further to create a tree topology between the node coordinator and the plurality of low power nodes.

Example 8 may include the apparatus of any of Examples 6 to 7, wherein the node coordinator is further to analyze the first association based on one or more of residual battery capacity, signal strength, and data redundancy for each of the low power nodes, and create a subsequent association for each of the plurality of lower power nodes based on the analysis.

Example 9 may include the apparatus of Example 8, further comprising a machine learner communicatively coupled to the node coordinator to provide the subsequent association based on the first association and one or more of residual battery capacity, signal strength, and data redundancy for each of the low power nodes.

Example 10 may include the apparatus of Example 6, wherein the node coordinator is further to create a centralized star topology between the node coordinator and the plurality of low power nodes.

Example 11 may include the apparatus of Example 7, wherein the coordinator is further to communicate with each of the plurality of low power nodes on a same channel.

Example 12 may include a method of coordinating low power nodes, comprising provisioning each of a plurality of low power nodes, creating a first association for each of the plurality of lower power nodes, and coordinating the plurality of lower power nodes.

Example 13 may include the method of Example 12, further comprising creating a tree topology between a node coordinator and the plurality of low power nodes.

Example 14 may include the method of any of Examples 12 to 13, further comprising analyzing the first association based on one or more of residual battery capacity, signal strength, and data redundancy for each of the low power nodes, and creating a subsequent association for each of the plurality of lower power nodes based on the analysis of the first association.

Example 15 may include the method of Example 14, further comprising machine learning the subsequent association based on the first association and one or more of residual battery capacity, signal strength, and data redundancy for each of the low power nodes.

Example 16 may include the method of Example 12, further comprising creating a centralized star topology between a node coordinator and the plurality of low power nodes.

Example 17 may include the method of Example 16, further comprising communicating between the node coordinator and each of the plurality of low power nodes on a same channel.

Example 18 may include at least one computer readable medium, comprising a set of instructions, which when executed by a computing device, cause the computing device to provision each of a plurality of low power nodes, create a first association for each of the plurality of lower power nodes, and coordinate the plurality of lower power nodes.

Example 19 may include the at least one computer readable medium of Example 18, comprising a further set of instructions, which when executed by a computing device, cause the computing device to create a tree topology between a node coordinator and the plurality of low power nodes.

Example 20 may include the at least one computer readable medium of any of Examples 18 to 19, comprising a further set of instructions, which when executed by a computing device, cause the computing device to analyze the first association based on one or more of residual battery capacity, signal strength, and data redundancy for each of the low power nodes, and create a subsequent association for each of the plurality of lower power nodes based on the analysis of the first association.

Example 21 may include the at least one computer readable medium of Example 20, comprising a further set of instructions, which when executed by a computing device, cause the computing device to machine learn the subsequent association based on the first association and one or more of residual battery capacity, signal strength, and data redundancy for each of the low power nodes.

Example 22 may include the at least one computer readable medium of Example 18, comprising a further set of instructions, which when executed by a computing device, cause the computing device to create a centralized star topology between a node coordinator and the plurality of low power nodes.

Example 23 may include the at least one computer readable medium of Example 22, comprising a further set of instructions, which when executed by a computing device, cause the computing device to communicate between the node coordinator and each of the plurality of low power nodes on a same channel.

Example 24 may include a network coordinator apparatus, comprising means for provisioning each of a plurality of low power nodes, means for creating a first association for each of the plurality of lower power nodes, and means for coordinating the plurality of lower power nodes.

Example 25 may include the apparatus of Example 24, further comprising means for creating a tree topology between a node coordinator and the plurality of low power nodes.

Example 26 may include the apparatus of any of Examples 24 to 25, further comprising means for analyzing the first association based on one or more of residual battery capacity, signal strength, and data redundancy for each of the low power nodes, and means for creating a subsequent association for each of the plurality of lower power nodes based on the analysis of the first association.

Example 27 may include the apparatus of Example 26, further comprising means for machine learning the subsequent association based on the first association and one or more of residual battery capacity, signal strength, and data redundancy for each of the low power nodes.

Example 28 may include the apparatus of Example 24, further comprising means for creating a centralized star topology between a node coordinator and the plurality of low power nodes.

Example 29 may include the apparatus of Example 28, further comprising means for communicating between the node coordinator and each of the plurality of low power nodes on a same channel.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
   a processor;
   persistent storage media communicatively coupled to the processor; and
   a coordinator communicatively coupled to the processor to coordinate a plurality of low power nodes, wherein the coordinator is further to:
   provision each of the plurality of low power nodes,
   determine transmission time slots that each correspond to when one of the low power nodes assigned to the transmission time slot is to transmit data to another low power node of the low power nodes or the coordinator,
   create a first association for each of the plurality of low power nodes to assign a different one of the transmission time slots to each of the low power nodes,
   create a tree topology between the coordinator and the plurality of low power nodes, wherein the tree topology is to include a plurality of branches that each include one or more of the low power nodes,
   create a subsequent association based on the tree topology to reassign a plurality of the transmission time slots to a group of the low power nodes based on the branches, and
   manage the plurality of low power nodes.

2. The system of claim 1, wherein the coordinator is further to:
   analyze the first association for information related to one or more of residual battery capacity, signal strength, and data redundancy for each of the low power nodes; and
   create the subsequent association for each of the plurality of low power nodes based on the analysis.

3. The system of claim 1, wherein the coordinator is further to create a centralized star topology between the coordinator and the plurality of low power nodes.

4. The system of claim 3, wherein the coordinator is further to communicate with each of the plurality of low power nodes on a same channel.

5. The system of claim 1, wherein the coordinator is to create the subsequent association to reassign a first transmission time slot of the plurality of the transmission time slots from a first low power node of the plurality of low power nodes to a second low power node of the plurality of low power nodes, and reassign a second transmission time slot of the plurality of the transmission time slots from the second low power node to the first low power node.

6. A method comprising:
   provisioning each of a plurality of low power nodes;
   determining transmission time slots that each correspond to when one of the low power nodes assigned to the transmission time slot is to transmit data to another low power node of the low power nodes or a node coordinator;
   creating a first association for each of the plurality of low power nodes to assign a different one of the transmission time slots to each of the low power nodes;
   creating a tree topology between the node coordinator and the plurality of low power nodes, wherein the tree topology is to include a plurality of branches that each include one or more of the low power nodes;
   creating a subsequent association based on the tree topology to reassign a plurality of the transmission time slots to a group of the low power nodes based on the branches; and
   coordinating the plurality of low power nodes.

7. The method of claim 6, further comprising:
   analyzing the first association based on one or more of residual battery capacity, signal strength, and data redundancy for each of the low power nodes; and
   creating the subsequent association for each of the plurality of low power nodes based on the analysis of the first association.

8. The method of claim 7, further comprising:
   machine learning the subsequent association based on the first association and one or more of residual battery capacity, signal strength, and data redundancy for each of the low power nodes.

9. The method of claim 6, further comprising:
creating a centralized star topology between the node coordinator and the plurality of low power nodes.

10. The method of claim 9, further comprising:
communicating between the node coordinator and each of the plurality of low power nodes on a same channel.

11. The method of claim 6, further comprising creating the subsequent association to reassign a first transmission time slot of the plurality of the transmission time slots from a first low power node of the plurality of low power nodes to a second low power node of the plurality of low power nodes, and reassign a second transmission time slot of the plurality of the transmission time slots from the second low power node to the first low power node.

12. At least one non-transitory computer readable medium, comprising a set of instructions, which when executed by a computing device, cause the computing device to:
provision each of a plurality of low power nodes;
determine transmission time slots that each correspond to when one of the low power nodes assigned to the transmission time slot is to transmit data to another low power node of the low power nodes or a node coordinator;
create a first association for each of the plurality of low power nodes to assign a different one of the transmission time slots to each of the low power nodes;
create a tree topology between the node coordinator and the plurality of low power nodes, wherein the tree topology is to include a plurality of branches that each include one or more of the low power nodes;
create a subsequent association based on the tree topology to reassign a plurality of the transmission time slots to a group of the low power nodes based on the branches; and
coordinate the plurality of low power nodes.

13. The at least one non-transitory computer readable medium of claim 12, comprising a further set of instructions, which when executed by a computing device, cause the computing device to:
analyze the first association based on one or more of residual battery capacity, signal strength, and data redundancy for each of the low power nodes; and
create the subsequent association for each of the plurality of low power nodes based on the analysis of the first association.

14. The at least one non-transitory computer readable medium of claim 13, comprising a further set of instructions, which when executed by a computing device, cause the computing device to:
machine learn the subsequent association based on the first association and one or more of residual battery capacity, signal strength, and data redundancy for each of the low power nodes.

15. The at least one non-transitory computer readable medium of claim 13, comprising a further set of instructions, which when executed by a computing device, cause the computing device to:
create a centralized star topology between the node coordinator and the plurality of low power nodes.

16. The at least one non-transitory computer readable medium of claim 15, comprising a further set of instructions, which when executed by a computing device, cause the computing device to:
communicate between the node coordinator and each of the plurality of low power nodes on a same channel.

17. The at least one non-transitory computer readable medium of claim 12, comprising a further set of instructions, which when executed by a computing device, cause the computing device to create the subsequent association to reassign a first transmission time slot of the plurality of the transmission time slots from a first low power node of the plurality of low power nodes to a second low power node of the plurality of low power nodes, and reassign a second transmission time slot of the plurality of the transmission time slots from the second low power node to the first low power node.

18. A semiconductor apparatus comprising:
one or more substrates; and
logic coupled to the one or more substrates, wherein the logic is implemented at least partly in one or more of configurable logic or fixed-functionality logic hardware, the logic coupled to the one or more substrates to:
provision each of a plurality of low power nodes,
determine transmission time slots that each correspond to when one of the low power nodes assigned to the transmission time slot is to transmit data to another low power node of the low power nodes or a coordinator,
create a first association for each of the plurality of low power nodes to assign a different one of the transmission time slots to each of the low power nodes,
create a tree topology between the coordinator and the plurality of low power nodes, wherein the tree topology is to include a plurality of branches that each include one or more of the low power nodes,
create a subsequent association based on the tree topology to reassign a plurality of the transmission time slots to a group of the low power nodes based on the branches, and
manage the plurality of low power nodes.

19. The apparatus of claim 18, wherein the logic is to:
analyze the first association based on one or more of residual battery capacity, signal strength, and data redundancy for each of the low power nodes; and
create the subsequent association for each of the plurality of low power nodes based on the analysis of the first association.

20. The apparatus of claim 19, wherein the logic is to:
machine learn the subsequent association based on the first association and one or more of residual battery capacity, signal strength, and data redundancy for each of the low power nodes.

21. The apparatus of claim 18, wherein the logic is to:
create a centralized star topology between the coordinator and the plurality of low power nodes.

22. The apparatus of claim 18, wherein the logic is to:
communicate between the coordinator and each of the plurality of low power nodes on a same channel.

23. The apparatus of claim 18, wherein the logic is to:
create the subsequent association to reassign a first time slot of the plurality of the transmission time slots from a first low power node of the plurality of low power nodes to a second low power node of the plurality of low power nodes, and reassign a second time slot of the plurality of the transmission time slots from the second low power node to the first low power node.

* * * * *